Patented July 8, 1924.

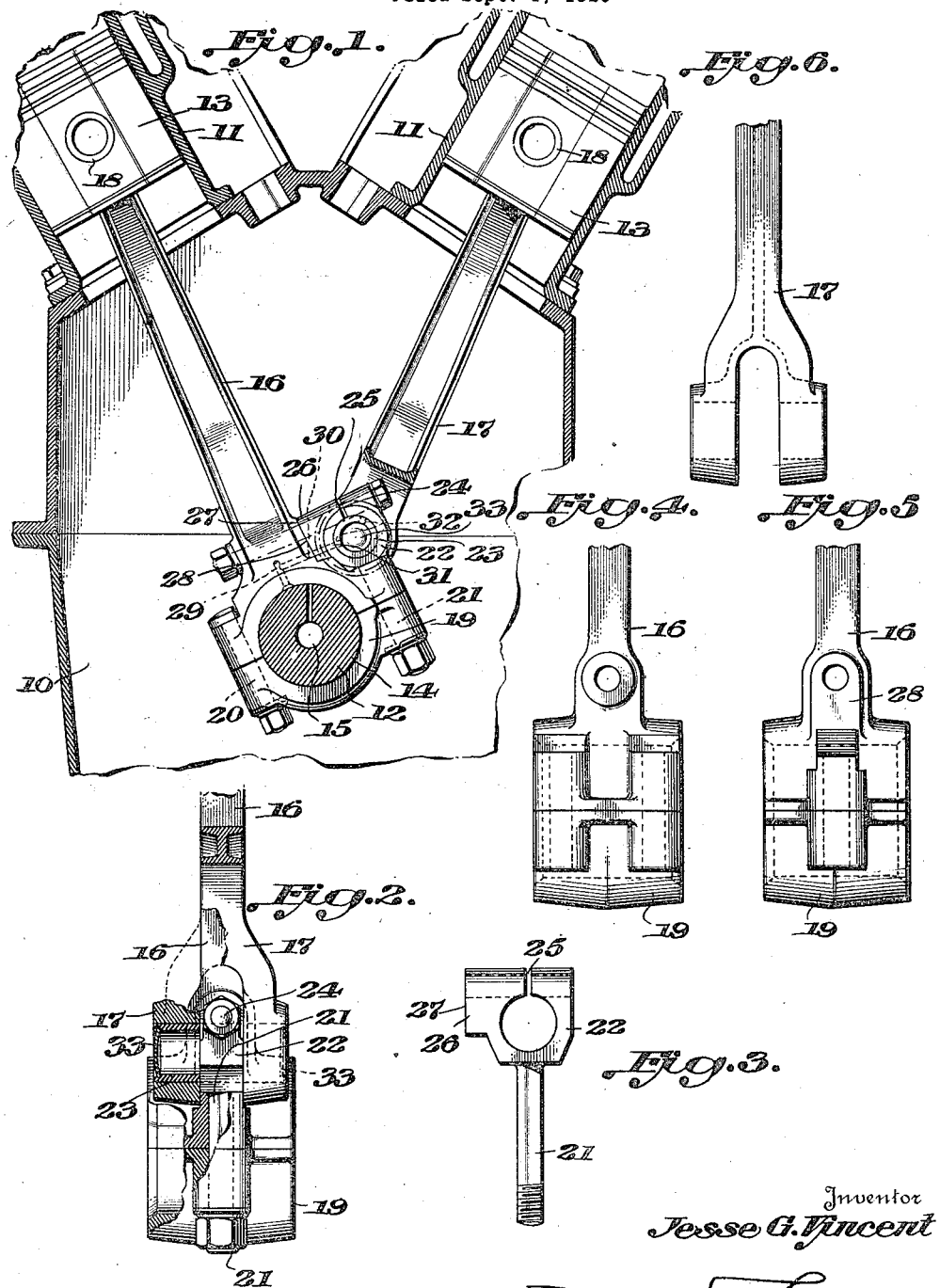

1,500,662

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed September 4, 1920. Serial No. 408,235.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This invention relates to hydrocarbon motors, and particularly to the connecting rod mechanism of motors.

In high speed hydrocarbon motors it is very desirable that the weight of the reciprocating parts, such as the pistons and connecting rods, be kept as low as possible. In motors of the V-type it is possible to reduce the weight somewhat by the use of articulated connecting rods, and it is the salient object of the present invention to provide a connecting rod mechanism of this type which shall have extreme lightness while at the same time retaining strength and compactness.

Other objects and advantages of the invention will appear from the following description taken in connection with the drawings which form a part of this specification, and in which—

Figure 1 is a transverse vertical section through a hydrocarbon motor embodying the invention;

Figure 2 is a side elevation of the connecting rod mechanism shown in Figure 1 with parts broken away;

Figure 3 is a detail view of the interconnecting member or trunnion block;

Figures 4 and 5 are opposite side views of the lower end of one of the connecting rods; and Figure 6 is a side view of the lower end of the other connecting rod.

Referring to the drawings, 10 represents the crank case of a hydrocarbon motor, and 11 are cylinder blocks set in V arrangement on the crank case. A crank shaft 12 is mounted in suitable bearings in the crank case and pistons 13 reciprocate in the respective cylinders.

One of the crank pins of the crank shaft 12 is shown at 14 and it will be seen that it is drilled as at 15 for receiving lubricating oil under pressure from a suitable source.

Connecting the pistons 13 to the crank pin 14 are connecting rods 16 and 17, the upper ends of which are pivoted or hinged to the pistons as by piston pins 18. The lower end of the connecting rod 16 has a bearing either directly or through a suitable sleeve on the crank pin 14. In the form shown, the connecting rod bears directly upon the cylindrical surface of the crank pin, which is practicable with aluminum composition, or aluminum alloy, or similar metals.

For the purpose of mounting the connecting rod 16 on the crank pin 14, its lower end is formed with a cap 19 which is detachably connected to the connecting rod as by bolts 20 and 21. There are preferably two bolts 20 on one side of the connecting rod, but on the other side it will be seen that there is but a single bolt 21, and the head of this bolt 21 is in the form of a block forming a trunnion member 22 for the other connecting rod 17. Thus this interconnecting or trunnion member 22 forms part of the connecting means for the cap 19 to the connecting rod 16 and it is adapted to support a trunnion or pin 23 which passes through it and which is clamped to it as by a bolt 24. This clamping is permitted by the fact that the member 22 is split as at 25 and is formed with a boss 26 having a flat machine face or spot 27 in contact with a similar machine face 28 on the side of the connecting rod 16. The bolt 24 above referred to not only passes through the block 22, but also through the connecting rod 16 at right angles to the bolt 21 and, therefore, transversely of the connecting rod. Thus the bolt 24 not only clamps the pin 23 to the trunnion member 22, but also rigidly connects the member 22 to the shank of the connecting rod 16. This two-way connection of the trunnion member 22 to the connecting rod makes a particularly solid construction and at the same time permits the cap 19 to be removed without interfering with the fastening of the trunnion 23 and the trunnion 23 to be removed without interfering with the connection of the rod 16 to the crank pin 14.

The connecting rod 17 is forked as shown particularly in Figure 6 and it straddles the block 22 when it is mounted on the trunnion or pin 23. This connecting rod 17 may also be made of aluminum or similar material that provides a good bearing surface so that no sleeve is necessary between it and the pin 23 which hingedly connects it with the other connecting rod.

For the purpose of feeding oil to the hinge connection between the connecting rod 17 and the trunnion member 22, a conduit is drilled in the connecting rod 16 as at 29 and in the block 22 as at 30, these conduits registering where the flat machined spots of the connecting rod and member come together. A hole is also drilled through the pin 23 as at 31 so that the lubricating oil under pressure reaches the interior of the hollow pin. Two or more oil holes 32 are provided in the pin 23 to convey the lubricant to the bearing surface of the pin. The ends of the pin 23 are closed as by disks 33, as shown particularly in Figure 2.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. Connecting rod mechanism comprising a connecting rod, and a trunnion member bolted two ways to said rod.

2. Connecting rod mechanism comprising a connecting rod, and a trunnion member bolted longitudinally and crossways to said rod.

3. Connecting rod mechanism comprising a connecting rod having a bearing cap, and a trunnion member securing said cap to the rod and also separately bolted to the rod.

4. Connecting rod mechanism comprising a connecting rod having a flat spot on one side, a trunnion member secured to said rod against said spot, a second connecting rod hinged to said member, and means for feeding oil from the first connecting rod to said trunnion member.

5. Connecting rod mechanism comprising a connecting rod having a flat spot on one side, a trunnion member secured to said rod against said spot, and a second connecting rod hinged to said member, there being an oil conduit from the bearing of the first connecting rod through said trunnion member to the hinge of the second rod.

6. Connecting rod mechanism comprising two connecting rods, and an interconnecting member forming a cap bolt for one rod and a trunnion support for the other rod.

7. Connecting rod mechanism comprising two connecting rods connected by a member bolted to one of said rods and hinged to the other of said rods.

8. Connecting rod mechanism comprising two connecting rods, and an interconnecting member bolted to one of said rods and supporting a trunnion for the other of said rods.

9. Connecting rod mechanism comprising a rod having a bearing cap, a bolt for said cap, and a trunnion connected to said bolt.

10. Connecting rod mechanism comprising a rod having a bearing cap, a bolt for said cap, a trunnion clamped to said bolt, and a second connecting rod mounted on said trunnion.

11. In a hydrocarbon motor, the combination with a crank shaft, of a connecting rod mounted thereon, a trunnion block bolted to said connecting rod, and a second connecting rod hinged on said trunnion block, said first connecting rod and said block having communicating oil passages to carry oil to the second connecting rod.

12. Connecting rod mechanism comprising a connecting rod, a trunnion member connected to said rod and having split trunnion supporting means, and a bolt passing through said connecting rod and through said trunnion member.

13. Connecting rod mechanism comprising a connecting rod, a trunnion member connected to said rod and having split trunnion supporting means, and a clamping bolt for said means passing through both the trunnion member and the connecting rod.

In testimony whereof I affix my signature.

JESSE G. VINCENT.